United States Patent
Maccone et al.

(10) Patent No.: US 6,469,116 B2
(45) Date of Patent: *Oct. 22, 2002

(54) AMORPHOUS FLUOROPOLYMER MANUFACTURED ARTICLES

(75) Inventors: Patrizia Maccone, Milan (IT);
Vincenzo Arcella, Novara (IT);
Giuseppina Grippaldi, Como (IT);
Enrico Drioli, Napoli (IT)

(73) Assignee: Ausimont S.p.A., Milan (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/340,137

(22) Filed: Jun. 28, 1999

(65) Prior Publication Data

US 2002/0065383 A1 May 30, 2002

(30) Foreign Application Priority Data

Jun. 30, 1998 (IT) .......................... MI98A1506

(51) Int. Cl.$^7$ ...................... C08F 216/12; C08F 214/18; C08F 214/26
(52) U.S. Cl. ...................... 526/247; 526/249; 526/250; 526/253; 526/255
(58) Field of Search ................. 526/247, 250, 526/255, 253

(56) References Cited

U.S. PATENT DOCUMENTS

| | | | |
|---|---|---|---|
| 2,242,218 A | | 5/1941 | Auer |
| 3,665,041 A | | 5/1972 | Sianesi et al. |
| 3,978,030 A | * | 8/1976 | Resnick ........................ 526/247 |
| 4,530,569 A | * | 7/1985 | Squire ....................... 350/96.34 |
| 4,565,855 A | * | 1/1986 | Anderson ................... 526/247 |
| 4,754,009 A | * | 6/1988 | Squire ........................ 526/247 |
| 4,948,851 A | | 8/1990 | Squire ........................ 526/247 |
| 4,954,271 A | | 9/1990 | Green ............................ 252/8 |
| 5,051,114 A | | 9/1991 | Nemser et al. ................ 55/16 |
| 5,883,177 A | * | 3/1999 | Colaianna ................... 524/462 |
| 5,914,154 A | | 6/1999 | Nemser |
| 5,960,777 A | * | 10/1999 | Nemser ....................... 123/585 |

FOREIGN PATENT DOCUMENTS

| | | |
|---|---|---|
| EP | 0 148 482 A2 | 12/1984 |
| EP | 0 239 123 A2 | 3/1987 |
| EP | 0 633 256 A1 | 12/1989 |
| EP | 0 416 528 A2 | 9/1990 |
| EP | 633257 A1 | 1/1995 |
| EP | 803557 A1 | 10/1997 |
| EP | 816400 A | 1/1998 |
| WO | WO 95/26218 | 3/1995 |
| WO | 99 31536 A | 6/1999 |

OTHER PUBLICATIONS

Tony Whelan, Polymer Technology Dictionary, First Edition, 1994, 84, Chapman & Hall, London.*
K. Kimmerle, H. Strathmann, *Elsevier Science Publishers B.V.*, Analysis of the Structure–Determining Process of Phase Inversion Membranes, pp. 283–302 (1990).
P.R. Resnick, W.H. Buck, *Modern Fluoropolymers*, Chapter 22, "Telfon® AF Amorphous Fluoropolymers", pp. 397–419 (1997).

* cited by examiner

*Primary Examiner*—Fred Zitomer
(74) *Attorney, Agent, or Firm*—Arent Fox Kintner Plotkin & Kahn

(57) ABSTRACT

Amorphous fluoropolymer selfsupported manufactured articles obtained by casting from solution in a single step, characterized in that they are obtained by the polymerization of a structure (I), optionally and preferably with a monomer having a structure (II):

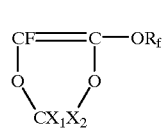

(I)

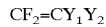

(II)

wherein: $R_f$ is a $C_1$–$C_5$ perfluoroalkyl radical; $X_1$ and $X_2$ are selected from F and $CF_3$; $Y_1$ and $Y_2$ are selected from F, Cl, H, $CF_3$, $OR_f$; having refractive index lower than 1.35, transmittance higher than 90% in the radiation field 300–2,000 nm wave length, and thickness higher than 20–25 μm.

26 Claims, No Drawings

AMORPHOUS FLUOROPOLYMER MANUFACTURED ARTICLES

The present invention relates to amorphous fluoropolymer manufactured articles for optical, electronic and chemical applications.

Specifically, the invention relates to the preparation of manufactured articles in the form of selfsupported capillaries and pipes and selfsupported films having a high thickness and high purity combined with good mechanical and optical properties; the preparation of manufactured articles in the form of semipermeable membranes for separation processes such as filtering, reverse osmosis and gaseous separation. More specifically, the membranes have an improved selectivity in the gaseous separation, for example for the oxygen in admixture with nitrogen, combined with a good permeability.

It is known in the art the preparation of films having an high transmittance and low refractive index, by dissolving an amorphous fluoropolymer in a solvent, filtering the solution and then using the spin coating to coat glassy substrates having a low thickness. This procedure is described in EP 416,528, wherein as fluoropolymer, an amorphous copolymer formed by perfluoro-2,2-dimethyl-1,3-dioxole (PDD) in amount comprised between 30% and 99% by moles and by tetrafluoroethylene (TFE) is used. The obtained films have a substantially uniform thickness in the range 0.3–20 $\mu$m and have a transmittance higher than 90% at wave lengths in the range 190–800 nm. The amorphous fluoropolymers forming the above films have a refractive index lower than the glass one and such as to allow the use thereof in anti-reflex layers in optical systems.

U.S. Pat. No. 4,948,851 describes manufactured articles obtained by the amorphous polymers mentioned in EP '528, in particular selfsupported films having a thickness in the range 100–400$\mu$m, prepared by molding of the melted amorphous polymer. The so obtained films contain impurities derived from materials with which they come into contact, for example molding plates. Tests carried out by the Applicant have shown that it is not possible to obtain by a single casting process, films having so high thicknesses. With these copolymers it is indeed possible to prepare selfsupported films by casting with a thickness in the range 20–25 $\mu$m.

U.S. Pat. No. 5,051,114 confirms what said above: the films obtained by deposition from casting have a thickness in the order of 25 $\mu$m; those obtained from melt have a thickness of one order magnitude superior. The obtained films can be used supported on porous substrates to form composite membranes useful for enriching and/or separating gaseous mixtures. In this patent selectivity values for the $O_2$ and $N_2$ from 2.0 to 2.4, depending on the PDD dioxole content in the PDD/TFE copolymer, are reported. It is shown that by increasing the dioxole content, the oxygen permeability increases but the selectivity decreases. Further data on the gas-selectivity are in chapter 22 of P. R. Resnick e W. H. Buck in "Modern Fluoro-polymers" (1997), wherein in the case of PDD/TFE copolymers membranes in molar ratio 87:13 obtained by casting, a 5.0 value for the $CO_2$ and $N_2$ and 4.4 for the $H_2$ and $N_2$ is indicated.

In all the prior art described herein no mention is made to the preparation by casting of selfsupported hollow small pipes and/or capillaries, having the combination of good mechanical and optical properties. Neither the preparation by casting of selfsupported films with thicknesses higher than 25 $\mu$m, which combine good mechanical and optical properties is reported. Indeed, when the films are obtained by molding of the melted amorphous polymer, they have a higher thickness and therefore good mechanical properties, but they have also contamination problems which compromise the optical properties of the final product.

The Applicant has surprisingly found that it is possible to obtain by the casting process from solution in a single step, manufactured articles such as selfsupported hollow small pipes and/or capillaries and fluoropolymer membranes or films having a high thickness and such as to overcome the drawbacks of the prior art. Besides, the membranes obtained by using said films, surprisingly have an improved selectivity in the gaseous separation, combined with a good permeability, with respect to those of the prior art above described.

It is therefore an object of the present invention selfsupported manufactured articles of amorphous fluoropolymers obtained by casting from solution in a single step, characterized in that they are obtained by the polymerization of a monomer having structure (I), optionally and preferably with a monomer having a structure (II):

(I)

(II)

wherein: $R_f$ is a $C_1$–$C_5$ perfluoroalkylic radical; $X_1$ and $X_2$ are selected from F and $CF_3$; $Y_1$ and $Y_2$ are selected from F, Cl, H, $CF_3$, $OR_f$; having a refractive index lower than 1.35, trasmittance higher than 90% in the wave length 300–2,000 nm, and thickness higher than 20–25 $\mu$m.

The manufactured articles of the invention show good mechanical properties which make it possible their use in a selfsupported form.

In order to obtain the selfsupported manufactured articles of the present invention the amorphous copolymer obtained by the above mentioned polymerization must have a composition in which the dioxole (I) is in the range 20%–100% by moles, preferably 40%–80% by moles.

The dioxoles (I) are reported in EP 633,256; preferably 2,2,4-trifluoro-5-trifluoromethoxy-1,3-dioxole (TTD) is used.

The comonomers (II) are tetrafluoroethylene, ($C_1$–$C_5$) perfluoroalkylvinylethers, trifluoroethylene, hexafluoropropene, chlorotrifluoroethylene, vinylidene fluoride; tetrafluoroethylene (TFE) is preferably used.

The manufactured articles of the invention are obtained by a process comprising the preparation of a solution of the amorphous polymer in a solvent up to a viscosity such that the solution can be handled and subsequently deposited by casting in a single step on a support of a defined configuration.

More specifically, in order to obtain the manufactured articles in form of small pipes or capillaries, the so obtained solution is let flow in glass tubular supports having a predefined internal diameter. When the fluid has wet all the support internal surface, the solution feeding is stopped and the so coated support is kept under filtered inert gas, preferably nitrogen or air, so as to take away the solvent, continuously renewing the so deposited polymer surface. The glass support is then thermally treated to completely dry the polymer; after this step the support internally coated by the dry polymer is completely dipped in water for some hours. By cutting with a cutter for glass the tubular support, a part of the internal pipe of fluorinated polymer is uncovered and by a simple mechanical operation the polymer is completely taken off from the glass. Depending on the viscosity and the solvent, it is possible to obtain hollow small pipes having external diameter sizes in the mm order or real capillaries with external diameter in the $\mu$m hundred order.

In order to obtain manufactured articles in the form of films, the amorphous polymer solution above described is deposited with a stratifying knife having a definite thickness on a flat and smooth support. After thermal treatment for the solvent removal a dry film is obtained. Depending on the solution viscosity and the support type the film has thicknesses in the range 25 μm–150 μm and shows good mechanical and optical properties.

With the above described method for films, also manufactured articles in the form of selfsupported thick membranes, optionally used on suitable supports for the obtainment of composite membranes, are obtained. To obtain asymmetrical membranes it is possible to use the phase inversion method as, for example, reported in the publication by K. Kimmerle and H. Strathmann, Desalination, 79, 283–302 (1990). According to this method, after the solution deposition, the support coated by the polymer is dipped in a coagulation bath formed by a non-solvent at a determined temperature. As non-solvents, the aliphatic hydrocarbon class having from 5 to 10 carbon atoms, preferably from 5 to 7, more preferably n-pentane, can be used.

As a support for the solution deposition by casting and subsequent obtainment of the manufactured articles of the present invention, for example: glass/quartz, polymethylmethacrylate, polycarbonate, polyurethane, polystyrene, ceramic and metal supports, thermoplastic fluoropolymers, preferably glass and polyurethane, can be used. More preferably a polyurethane support is used since it has been found that with this specific support it is possible to obtain, the conditions being equal, higher film thicknesses.

As solvents for the casting process of the present invention, (per)fluoropolyethers (Galden®, Fomblin®, Krytox®, Demnum®), dihydroperfluoropolyethers (H-Galden®), fluorinated and perfluorinated Fluorinert® ethers (FC and HFE series) optionally containing one or more hydrogen atoms in the end groups, perfluoroalkanes and all the solvents having a solubility parameter similar to that of the employed amorphous polymer, can be used.

For the solubility parameter determination vapour pressure measurements are carried out in relation with the temperature so as to obtain the vaporization enthalpy ($\Delta H^\circ$) of the employed solvent. From the vaporization enthalpy the vaporization energy ($\Delta E^\circ$) is obtained:
$\Delta E^\circ = \Delta H^\circ - RT$, wherein T=298 K. From the vaporization energy the cohesive energy density (CED) is obtained:
CED=$\Delta E^\circ$/V; wherein V=solvent molar volume. The solubility parameter is equal to $(CED)^{1/2}$.

The (per)fluoropolyethers used as solvents are polymers containing the following units, statistically distributed along the chain, selected from: $(C_3F_6O)$, $(C_2F_4O)$, (CFXO) wherein X is equal to F or $CF_3$, $(CR_1R_2CF_2CF_2O)$ wherein $R_1$ equal to or different from $R_2$ is H, F, $C_1$–$C_3$ perfluoroalkyl.

The following (per)fluoropolyethers can specifically be mentioned:

a) —O$(C_3F_6O)_{m'}(CFXO)_{n'}$— wherein the $(C_3F_60)$ and (CFXO) units are perfluorooxyalkylenic units statistically distributed along the chain; m' and n' are integers such as to give products with boiling point generally in the range 60°–300° C., preferably 60°–150° C., and m'/n' is in the range 5–40, when n' is different from 0; X is equal to F or $CF_3$; n' can also be 0;

b) —O$(C_2F_4O)_{p'}$ $(CFXO)_{q'}$—$(C_3F_6O)_{t'}$
wherein p', q' and t' are integers such as to give products with the boiling point indicated in a), p'/q' is in the range 5–0.3, preferably 2.7–0.5; t' can be 0 and q'/(q'+ p'+t') lower than or equal to 1/10 and the t'/p' ratio is from 0.2 to 6;

c) —$(CR_1R_2CF_2CF_2O)_n$— wherein $R_1$ and $R_2$ have the above indicated meaning, and n is an integer such as to give products having the boiling point mentioned in a).

The (per)fluoropolyether end groups are selected from —$CF_3$, —$C_2F_5$, —$C_3F_7$, optionally containing one or two chlorine atoms, and —$CF_2H$, —$CFHCF_3$.

The indicated fluoropolyethers are obtainable by the well known processes in the art for example U.S. Pat. Nos. 3,665,041, 2,242,218, 3,715,378, 4,954,271 and European patents EP 239,123, EP 148,482, WO 95/26218.

(Hydro)perfluoropolyethers contain as end groups one or two end groups selected from —$CF_2H$, —$CFHCF_3$. The boiling points are in the range 50°–250° C., preferably 50°–150° C.

In order to further improve the mechanical properties such as bending and yield at strain of the invention manufactured articles, a plasticizer having number average molecular weight higher than 1,000, preferably higher than 3,000, still more preferably higher than 8,000 such as perfluoropolyethers, as Fomblin®, Krytox®, Demnum®, dihy-droperfluoropolyethers (H-Galden®), PCTFE (Kel-F®) oligomers, can be used.

The fluoropolymer manufactured articles obtained with the described processes can therefore be used in all the applications where an high transmittance, a low refractive index and high chemical resistance are required.

Besides, such manufactured articles can be used as thick, asymmetrical and composite semipermeable membranes in flat, tubular form or hollow fiber to carry out separation processes such as for example ultrafiltering, microfiltering, nanofiltering, reverse osmosis and gaseous separation.

It has unexpectedly been found by the Applicant that the membranes obtained by the (co)polymers of the present invention allow to obtain a higher selectivity in the gaseous separation, even maintaining a good permeability, with respect to the amorphous polymers of the prior art, which use dioxoles having a different structure.

For the high chemical resistance and hydrophobicity characteristics due to the perfluorinated structure of the invention amorphous polymer, said membranes can be used as membrane contactors. As application of "membrane contactors" the purification of a fluid containing gaseous impurities put into contact with a side of the membrane, which can be in supported or selfsupported microporous form, can be mentioned. For example in the semiconductor industry, membrane contactors are used to obtain ultrapure water free from dissolved gases. The gases to be eliminated, differently from the liquid, pass through the membrane allowing to obtain a purified liquid. Due to the high chemical polymer resistance, the invention membranes can be used with liquid and/or aggressive gases.

When higher optical properties are desired, the amorphous polymer solution to be used for the casting is purified by conventional filtering and/or centrifugation methods. Preferably in order to further improve the optical properties, said solution is submitted to microfiltration and ultrafiltration/nanofiltration processes. This process is described in the Italian patent application MI98 A 001505 in the name of the Applicant filed on the same day as the present patent application, herein incorporated by reference, and having for title "Purification of fluorinated polymers". Said purification process of amorphous polymers comprises the following steps:

a) the amorphous polymer is dissolved in a fluorinated solvent selected from those indicated for the casting process, preferably in a concentration in the range 0.1–15% w/w, more preferably 0.3–5=w/w;

b) the solution containing the polymer is microfiltered by semipermeable membranes having porosity in the range 0.05–0.5 μm, preferably 0.1–0.3 μm, and the permeate forms the polymeric solution purified from the contaminants in suspension;

c) the permeate coming from b) is ultrafiltered/nanofiltered by membranes having porosity in the range 10–500 kDa, preferably 20–300 kDa, more preferably 20–80 kDa, and the retentate is formed by the polymeric solution purified by the contaminants in solution.

The amorphous polymer solution purified by the described process is evaporated/diluted so as to obtain the desired concentration and then used for the casting process.

With the amorphous polymers of the present invention it is possible to obtain manufactured articles by casting from solution having thickness even lower than 20–25 µm. In any case, surprisingly, the obtained thicknesses are always higher than those obtainable with the dioxoles of the prior art (see the examples) starting from solutions having the same viscosity. The obtained manufactured articles have uniform surface and thickness.

The present invention will be now better illustrated by the following working examples, which have only an indicative purpose which is not limitative of the scope of the invention itself.

EXAMPLES

Characterization

The viscosity measurements reported in the Examples have been carried out by Brookfield DVII+ viscometer at the temperature of 25° C. thermostated by Haake F6 thermoregulator.

An URAI spreading-film having eight slits PGTC model 2, 5–50 mils has been used as stratifying knife.

The thickness evaluation has been carried out by optical microscope and Mitutoyo IDF-130 type comparator having a ±0.001 mm precision.

The refractive index measurements have been carried out with a Bausch & Lomb refractometer thermostated at the temperature of 20° C. by a bath equipped with a Haake F3 thermoregulator.

The transmittance data have been obtained by UV Perkin Elmer UV/Vis Lambda 2 spectrophotometer.

The tensile properties have been determined by ASTM D1708 method at the temperature of 23° C.

The gas permeability has been determined by volumetric cell thermostated at the temperature of 25° C.

EXAMPLE 1

A copolymer solution consisting of 60% of TTD and 40% of TFE by moles and Fluorinert® FC-75 (2-butyltetrahydrofuran) having a 22 cPoise viscosity is spread on a flat and smooth glass support by a stratifying knife having a definite thickness equal to 10 mils. After thermal treatment for the solvent removal a dry film with a 12 µm thickness is obtained.

EXAMPLE 2 (comparative)

A PDD/TFE copolymer solution in molar ratio 65/35 and Fluorinert® FC-75 having a 22 cPoise viscosity is spread on a flat and smooth glass support by a stratifying knife having a definite thickness equal to 10 mils. After thermal treatment for the solvent removal a dry film having a 5 µm thickness is obtained.

EXAMPLE 3

A copolymer solution formed by 60% of TTD and 40% of TFE by moles and perfluoroheptane having 1 Poise viscosity is spread on a flat and smooth polyurethane support by a stratifying knife having a definite thickness equal to 30 mils. After thermal treatment a dry easily removable film having a 120 µm thickness is obtained. The refractive index value measured at 20° C. results 1.327 and the light percentage transmitted in a wave length band between 300 nm and 2,000 nm is higher than 90%.

EXAMPLE 4

A copolymer solution formed by 40% of TTD and 60% of TFE by moles and perfluoroheptane having 1 Poise viscosity is spread on a flat and smooth glass support by a stratifying knife having a definite thickness equal to 50 mils. After thermal treatment a dry film having a 75 µm thickness is obtained.

The refractive index measured at 20°C. results to be 1.331.

EXAMPLE 5

A copolymer formed by 80% of TTD and 20% of TFE by moles, having glass transition temperature (Tg) 135° C., is dissolved in a Galden® HT55 solvent (perfluoropolyether of (a) type having boiling point of 55° C.) in the presence of a Fomblin®Z60 plasticizer. The resulting solution is prepared so as to have a 20% by weight plasticizer content with respect to the polymer and the total polymer and plasticizer percentage in the solution is of 12% by weight. Such solution is spread on a flat and smooth glass support by a stratifying knife having a definite thickness equal to 10 mils. After thermal treatment a dry film with a 25 µm thickness is obtained. The effect of the plasticizer presence in the obtained manufactured article is shown in the Tg measure, evaluated by DSC, resulting equal to 90° C.

The mechanical properties evaluated on the obtained film are shown in Table 1 with respect to a corresponding film prepared in the same way, but without addition of plasticizer. In the following Table the tensile tests indicated by (*) refer to a 1 mm/min speed, the tensile tests indicated by (**) refer to a 5 mm/min speed.

TABLE 1

| TTD % mol | Elastic modulus (MPa) | Yield stress (MPa) | Yield elongation (%) | Plasticizer |
|---|---|---|---|---|
| 80 | 1500 (*) | 28 (*) | 35 (*) | absent |
| 80 | 925 () | 17.5 () | 6.5 (**) | present |

EXAMPLE 6

A copolymer solution formed by 60% of TTD and 40% of TFE by moles and Galden® HT110 (perfluoropolyether of (a) type having boiling point of 100° C.) having 37 Poise viscosity is let flow in a glass pipe having a 3 mm internal diameter. When the solution has completely wetted the internal surface of the support, the fluid feeding is stopped and the glass support is kept under nitrogen for some hours. After thermal treatment, the support is completely dipped in water for some hours in order to facilitate the polymer release. The so obtained amorphous polymer pipe appears smooth, without evident discontinuities, and with a constant thickness and having the following sizes: external diameter 3 mm and 50 µm thickness.

EXAMPLE 7

A copolymer solution formed by 80% of TTD and 20% of TFE by moles and H-Galden® (boiling point in the range 120°–160° C., having a (b) type structure, wherein t'=0 and the end groups are of perfluorinated type each containing one hydrogen atom) having a concentration equal to 15% by weight and having 40 Poise viscosity is let flow in a glass pipe with a 1.5 mm internal dimater. When the solution has completely wet the support internal surface, the fluid feeding is stopped and the coated support is kept under nitrogen for some hours. After thermal treatment, the support is completely dipped in water for some hours in order to facilitate the polymer release. The so obtained amorphous polymer pipe appears smooth, without evident discontinuities, having a constant thickness and the following sizes: external diameter 1.5 mm and a 30 µm thickness.

EXAMPLE 8

A copolymer solution formed by 60% of TTD and 40% of TFE by moles and Galden® HT55 having 10 Poise viscosity is let flow in a tubular glass support with a 0.5 mm internal diameter. When the solution has completely wetted the support internal surface, the fluid feeding is stopped and the glass support is kept under nitrogen for some hours. After thermal treatment, in order to completely dry the polymer, the support internally coated by the polymer is completely dipped in water for some hours in order to facilitate the polymer release. The so obtained amorphous polymer capillary appears smooth, without evident discontinuities, having a constant thickness and the following sizes: external diameter 500 µm and a 30 µm thickness.

EXAMPLE 9

A copolymer solution formed by 60% of TTD and 40% of TFE by moles and Galden® HT55 having a concentration equal to 10% by weight is spread on a glass support by a stratifying knife having a definite thickness equal to 10 mils. Then the support with the just spread polymer is dipped in n-pentane at a temperature of 20° C., obtained by cooling the coagulation bath with ice. In this way an asymmetrical membrane is obtained by phase inversion. Such membrane is characterized by permeability tests in $O_2$, $N_2$ and $CO_2$. The data are obtained at room temperature, with two different pressure gradients and are reported in Table 2.

TABLE 2

| Pressure | Permeability (Barrers) | | | Selectivity | |
|---|---|---|---|---|---|
| (Kg/cm²) | $O_2$ | $N_2$ | $CO_2$ | $O_2/N_2$ | $CO_2/N_2$ |
| 5 | 111 | 34.1 | 269 | 3.2 | 7.9 |
| 7.5 | 108 | 34.1 | 271 | 3.2 | 7.9 |

EXAMPLE 10

An amorphous copolymer TTD/TFE solution in 80/20 molar ratio is prepared by dissolution of the same in Galden HT 55 so as to obtain a very diluted solution. This solution is spread by the spin coating method on a PVDF porous support. The spread amorphous polymer layer results to be of about 1 µm. The so obtained composite membrane is characterized by permeability tests to different gases. In Table 3 the permeability and selectivity data, compared with the values taken from the "Modern Fluoropolymers", Chapt. 22 (1997) reference, are reported.

TABLE 3

| Copolymer dioxol/TFE | Permeability (Barrers) | | | | Selectivity | | |
|---|---|---|---|---|---|---|---|
| | $O_2$ | $N_2$ | $H_2$ | $CO_2$ | $O_2/N_2$ | $CO_2/N_2$ | $H_2/N_2$ |
| 80% TTD | 194 | 77 | 563 | 473 | 2.5 | 6.2 | 7.3 |
| 87% PDD | 990 | 490 | 2000 | 2800 | 2.0 | 5.0 | 4.4 |

In the next summarizing Table 4 the thickness values of the various manufactured articles obtained in Examples 1–10 are reported.

TABLE 4

| | Copolymer TTD/TFE (% mol) | Used Solvent | Manufactured article | Thickness |
|---|---|---|---|---|
| Example 1 | 60/40 | FC-75 | Film | 12 µm |
| Example 2 (comparative) | 65/35 PDD/TFE | FC-75 | Film | 5 µm |
| Example 3 | 60/40 | $C_7F_{16}$ | Film | 120 µm |
| Example 4 | 40/60 | $C_7F_{16}$ | Film | 75 µm |
| Example 5 | 80/20 | HT55/Fomblin | Film | 25 µm |
| Example 6 | 60/40 | HT 110 | Pipe $\phi_{ext}$ = 3 mm | 50 µm |
| Example 7 | 80/20 | H-Galden | Pipe $\phi_{ext}$ = 1.5 mm | 30 µm |
| Example 8 | 60/40 | HT55 | Capillary $\phi_{ext}$ = 500 µm | 30 µm |
| Example 9 | 60/40 | HT55 | Asymm. membrane | |
| Example 10 | 80/20 | HT55 | Composite membrane | 1 µm |

What is claimed is:

1. Autosupported manufactured articles from amorphous flouropolymers in the form of films or membranes, obtained by casting from solution in a single step, wherein said amorphous polymers have been obtained by the copolymerization of a structure (I), with a monomer having a structure (II):

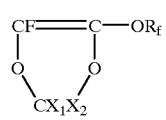

(I)

$CF_2=CY_1CY_2$ wherein: $R_f$ is a $C_1$–$C_5$ perflouroalkyl radical; $X_1$ and $X_2$ are selected from F and $CF_3$; $Y_1$ and $Y_2$ are selected from F, Cl, H, $CF_3$, $OR_f$; having a refractive index lower than 1.35, transmittance higher than 90% in the radiation field 300–2000 nm wave length, and thickness higher than 25 µm, wherein the dioxole percentage of structure (I) is comprised between 20% and 100% by moles.

2. Manufactured articles according to claim 1 wherein the dioxole having structure (I) is 2,2,4-trifluoro-5-trifluoromethoxy-1,3-dioxole (TTD); and the compounds having structure (II) are selected from the group consisting of tetrafluoroethylene, ($C_1$–$C_5$) perfluoroalkylvinylethers, trifluoroethylene, hexafluoropropene, chlorotrifluoroethylene, vinylidene fluoride.

3. Manufactured articles according to claim 1 wherein the membranes are thick, asymmetrical and composite semipermeable membranes in flat, tubular form or hollow fiber.

4. A process for preparing manufactured articles according to claim 1, comprising the preparation of the amorphous polymer solution in a solvent up to a viscosity such that the solution can be handled and subsequently spread by casting in a single step on a support of a definite configuration.

5. A process for the preparation of manufactured articles according to claim 4 wherein in order to obtain the manufactured articles under the form of small tubes or capillaries, the solution is let flow in tubular glass supports having a predefinite internal diameter; when the fluid has wetted all the support internal surface, the solution feeding is stopped and so coated support is kept under filtered inert gas; the glass support is then thermally treated to completely dry the polymer; the support is completely dipped in water, mechanically the polymer is completely taken off from the glass.

6. A process for preparing manufactured articles according to claim 4 wherein in order to obtain the manufactured articles in the form of films, the amorphous polymer solution is spread with a stratifying knife having a definite thickness on a flat and smooth support; subsequently it is thermally treated for the solvent removal.

7. A process for the preparation of manufactured articles according to claim 6 wherein the film is in the form of autosupported thick membrane, optionally used on supports for the obtainment of composite membranes.

8. A process for the preparation of manufactured articles according to claim 7 wherein the membrane is asymmetrical, obtained by the phase inversion method using as non-solvent the aliphatic hydrocarbon class having from 5 to 10 carbon atoms.

9. A process for the preparation of manufactured articles according to claim 4 wherein the support for the solution spreading by casting is selected among glass/quartz, polymethylmethacrylate, polycarbonate, polyurethane, polystyrene, ceramic and metal supports, thermoplastic fluoropolymers.

10. A process for the preparation of manufactured articles according to claim 9, wherein the support is polyurethane.

11. A process for the preparation of manufactured articles according to claim 4 wherein the solvent is selected from (per)fluoropolyethers, dihydroperfluoropolyethers, fluorinated and perfluorinated ethers, optionally containing one or more H atoms in the end groups, perfluoroalkanes.

12. A process for the preparation of manufactured articles according to claim 11, wherein the (per)fluoropolyethers contain the following units, statistically distributed along the chain, selected from: $(C_3F_6O)$, $(C_2F_4O)$, (CFXO) wherein X is equal to F or $CF_3$, $(CR_1R_2CF_2CF_2O)$ wherein $R_1$ equal to or different from $R_2$ is H, F, perfluoroalkyl $C_1$–$C_3$.

13. A process for the preparation of manufactured articles according to claim 12 wherein the (per)fluoropolyethers are selected from:

a) —$O(C_3F_6O)_{m'}(CFXO)_{n'}$— wherein the $(C_3F_6O)$ and (CFXO) units are perfluorooxyalkylenic units statistically distributed along the chain; m' and n' are integers such as to give products having boiling point in the range 60°–300° C., and m'/n' is comprised between 5 and 40, when n' is different from 0; X is equal to F or $CF_3$; n' can also be 0;

b) —$O(C_2F_4O)_{p'}(CFXO)_{q'}$—$(C_3F_6O)_{t'}$ wherein p', q' and t' are integers such as to give products having the boiling point indicated in a), p'/q' is in the range 5–0.3, t' can be equal to 0 and q'/(q'+p'+t') lower than or equal to ⅒ and the t'/p' ratio is from 0.2 to 6;

c) —$(CR_1R_2CF_2CF_2O)_n$— wherein $R_1$ and $R_2$ have the above indicated meaning, and n is an integer such as to give products with the boiling point indicated in a);

the end groups are selected from —$CF_3$, —$C_2F_5$, $C_3F_7$, optionally containing one or two chlorine atoms, and $CF_2H$, —$CFHCF_3$.

14. A process for the preparation of manufactured articles according to claim 4, wherein a plasticizer is used having an average molecular weight higher than 1,000.

15. A process for the preparation of manufactured articles according to claim 4, wherein the amorphous polymer solution to be used for the casting is purified by filtering and/or centrifugation methods.

16. A process for the preparation of manufactured articles according to claim 15, wherein the solution is submitted to microfiltering and ultrafiltering/nanofiltering processes.

17. The process of claim 5, wherein the filtered inert gas is air.

18. The process of claim 5, wherein the filtered inert gas is nitrogen.

19. The process of claim 8, wherein the non-solvent used is the aliphatic hydrocarbon class which has 5 to 7 carbon atoms.

20. The process of claim 8, wherein the non-solvent used is n-pentane.

21. The process of claim 9, wherein the support is glass.

22. The process of claim 9, wherein the support is polyurethane.

23. The process of claim 13, wherein p'/q' is in the range of 2.7–0.5.

24. The process of claim 14, wherein the plasticizer has an average molecular weight higher than 3,000.

25. The process of claim 14, wherein the plasticizer has an average molecular weight higher than 8,000.

26. The process of claim 13, wherein m' and n' are integers such as to give products having a boiling point in the range of 60°–150° C.

\* \* \* \* \*